United States Patent Office 3,478,014
Patented Nov. 11, 1969

3,478,014
ERYTHROMYCIN OXIME AND 9-AMINO-3-O-CLAN-DINOSYL - 5 - O - DESOSAMINYL - 6,11,12 - TRIHYDROXY - 2,4,6,8,10,12 - HEXAMETHYL - PENTADECANE-OLIDE
Slobodan Djokic and Zrinka Tamburasov, Zagreb, Yugoslavia, assignors to PLIVA, Pharmaceutical and Chemical Works, Zagreb, Yugoslavia, a corporation of Yugoslavia
No Drawing. Filed Aug. 16, 1967, Ser. No. 660,895
Int. Cl. C07c 47/18; A61k 21/00
U.S. Cl. 260—210    4 Claims

ABSTRACT OF THE DISCLOSURE

The present invention relates to the preparation of erythromycin oxime and 9-amino-3-O-cladinosyl-5-O-desosaminyl - 6,11,12 - trihydroxy - 2,4,6,8,10,12 - hexamethylpentadecane - 13 - olide erythromycylamine therefrom, which are new antibiotic compounds.

The novel compounds of the invention can be represented by the formulae:

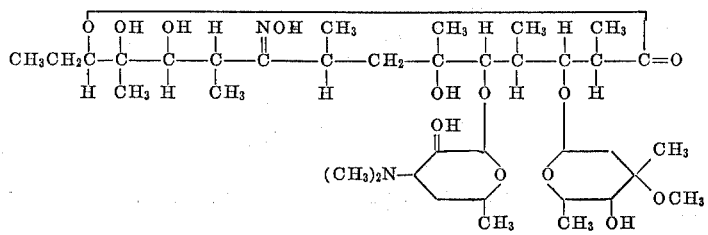

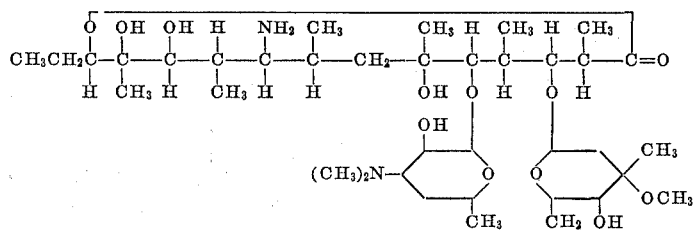

These new compounds are useful by virtue of their unexpectedly high stability in an acid medium even at pH 2 and/or their use as intermediates for the preparation of new compounds with antibacterial activity.

Erythromycin is an antibiotic of the macrolyde type, having the following structural formula:

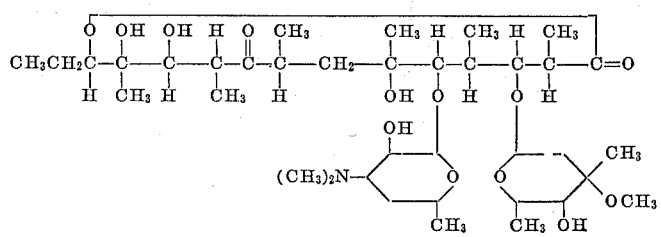

By reduction thereof, dihydroerythromycin is prepared, in which the keto group in position 9 of the aglycone part of molecule has been converted into a hydroxyl group. A dihydroerythromycin is biologically inactive, it is supposed that the keto group is one of the decisive factors conferring antibiotic action upon erythromycin.

According to the present invention, the carbonyl group in position 9 of erythromycin can be oximated, and thereafter the oxime obtained converted by reduction to 9-amino - 3 - O - cladinosyl - 5 - O - desosaminyl - 6,11,12-trihydroxy - 2,4,6,8,10,12 - hexamethyl - pentadecane - 13-olide, while both compounds still retain their antibiotic activity.

According to this invention, the oximation of erythromycin is carried out by the action of hydroxylamine, which is being set free by reaction of its salts, such as hydroxylamine hydrochloride, with alkaline reagents, e.g. barium carbonate, in an inert anhydrous organic solvent, e.g. methanol, with the exclusion of moisture, at pH of about 7 and at elevated temperature. The erythromycin oxime prepared is converted by means of reducing agents, such as sodium borohydride, to 9-amino-3 - O - cladinosyl - 5 - O - desosaminyl - 6,11,12 - trihydroxy - 2,4,6,8,10,12 - hexamethylpentadecane - 13 - olide, while the other part of the erythromycin molecule remains unchanged.

9 - amino - 3 - O - cladinosyl - 5 - O - desosaminyl - 6, 11,12 - trihydroxy - 2,4,6,8,10,12 - hexamethylpentadecane-13-olide is characterized by its dipicrate prepared from sodium picrate and an amine in methanol hydrochloric acid solution, and by its dihydrochloride prepared from a methanol solution of hydrochloric acid.

Determination of antibiotic activity of erythromycin oxime and 9-amino-3-O-cladinosyl-5-O-desosaminyl-6,11, 12 - trihydroxy - 2,4,6,8,10,12 - hexamethylpentadecane-13-olide on *Bacillus subtilis* and *Bacillus mycoides* has shown that the oxime possesses an activity of 500–550 u./mg., and the amine one 460–500 u./mg.

The stability of these compounds at pH 2 illustrates the unexpected advantages compared with that of erythromycin itself:

| | Activity after hour | | | |
|---|---|---|---|---|
| | 0 | 1 | 3 | 6 |
| Erythromycin, u./mg | 875 | Traces | 0 | 0 |
| Erythromycin oxime, u./mg | 506 | 440 | 337 | 289 |
| Erythromycylamine, u./mg | 460 | 370 | 330 | 292 |

The remarkable effect of an oximino and an amino group is clear from the table.

The following examples, in which erythromycin oxime and 9 - amino - 3 - O-cladinosyl-5-O-desosaminyl-6,11,12-trihydroxy - 2,4,6,8,10,12 - hexamethylpentadecane - 13-olide are produced by the process according to the invention, are given by way of illustration:

EXAMPLE 1

Erythromycin oxime 30 g. of erythromycin were dissolved in 150 ml. of water-free methanol, 14.7 g. of hydroxylamine hydrochloride and 21.0 g. of barium carbonate were then added and the mixture was refluxed for 22 hours with the exclusion of moisture. The suspension obtained was filtered and the precipitate on the filter was washed with hot methanol. The methanol filtrates were combined and evaporated in vacuo to ⅓ of the original volume. After cooling, the resultant colourless crystalline product was filtered off, washed with ether and dried at room temperature in vacuo. The yield: 14.5 g. (48.3%) of erythromycin oxime; M.P.: 176°–186° C. After recrystallisation from absolute methanol, the product had M.P.: 184–189° C. (decomposition); $\alpha_D^{25} = -73.5°$ (C=1% in methanol). Activity on *Bacillus subtilis* and *Bacillus mycoides*: 500–550 u./mg.

*Analysis.*—Calculated for $C_{37}H_{68}N_2O_{13}$: 748.930; N, 3.73%. Obtained: N, 3.41%.

EXAMPLE 2

9-amino - 3 - O - cladinosyl - 5 - O - desosaminyl-6,11,12-trihydroxy - 2,4,6,8,10,12 - hexamethylpentadecane-13-olide To a solution of 3.0 g. of sodium borohydride in 30 ml. of water-free methanol, a solution of 10.0 g. of erythromycin oxime in 30 ml. of water-free methanol was added drop by drop with stirring and cooling for 3 hours. The temperature of the reaction mixture was not allowed to exceed 10° C. Then the reaction mixture was left for two days at room temperature, whereafter dry carbon dioxide gas was introduced. The precipitate formed was filtered off and the filtrate evaporated to dryness in vacuo at room temperature. The residue was dissolved in 100 ml. of chloroform and the solution was washed three times with 25 ml. portions of 10% aqueous sodium bicarbonate solution and twice with 25 ml. portions of water. The chloroform extract was then dried over sodium sulphate, filtered and evaporated to dryness in vacuo. The resultant crude 9-amino-3-O-cladinosyl-5-O - desosaminyl - 6,11,12 - trihydroxy-2,4,6,8,10,12-hexamethylpentadecane-13-olide was recrystallised from an ether and petroleum ether mixture: M.P.: 142°–147° C.; $\alpha_D^{25} = -50°$ (C=1% in methanol). The yield: 7 g. (70%). Activity on *Bacillus subtilis* and *Bacillus mycoides*: 460–500 u./mg.

*Analysis.*—Calculated for $C_{37}H_{70}N_2O_{12}$: 734.946; N, 3.81%. Obtained: N, 4.02%.

EXAMPLE 3

9-amino - 3 - O - cladinosyl-5-O-desosaminyl-6,11,12-trihydroxy - 2,4,6,8,10,12 - hexamethylpentadecane - 13-olide dipicrate was prepared from the amine and sodium picrate in a methanol solution of hydrochloric acid; M.P.: 185°–187° C.

*Analysis.*—Calculated for $C_{49}H_{76}N_8O_{26}$: 1193.16; N, 9.43%. Obtained: N, 9.63%.

EXAMPLE 4

9-amino - 3 - O - cladinosyl-5-O-desosaminyl-6,11,12-trihydroxy - 2,4,6,8,10,12 - hexamethylpentadecane - 13-olide dihydrochloride was prepared from a methanol solution of the amine and a solution of hydrochloric acid in methanol; M.P.: 142°–144° C.

*Analysis.*—Calculated for $C_{37}H_{72}N_2O_{12}Cl_2$: 807.886; C, 55.01; H, 8.98; N, 3.47%. Obtained: C, 55.26; H, 8.69; N, 3.63%.

What we claim is:

1. Erythromycin oxime of the formula:

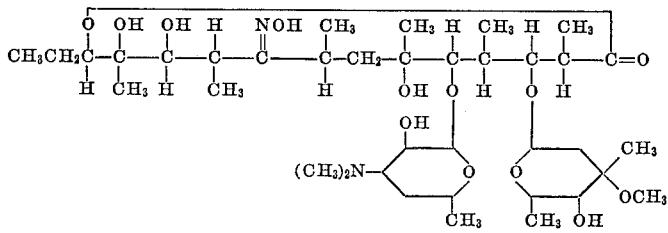

2. 9 - amino - 3 - O - cladinosyl - 5 - O - desosaminyl-6,11,12 - trihydroxy - 2,4,6,8,10,12 - hexamethylpentadecane-13-olide of the formula:

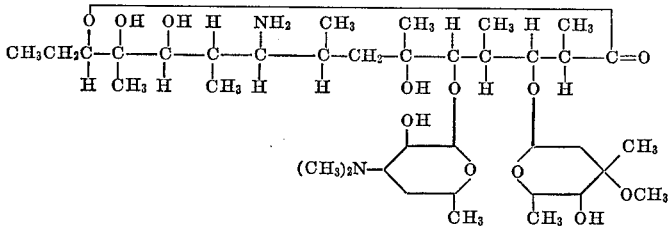

3. 9-amino - 3 - O - cladinosyl - 5 - O - desosaminyl-6,11,12 - trihydroxy - 2,4,6,8,10,12 - hexamethylpentadecane - 13 - olide dipicrate of the empirical formula $C_{49}H_{76}N_8O_{26}$.

4. 9 - amino - 3 - O - cladinosyl - 5 - O - desosaminyl-6,11,12 - trihydroxy - 2,4,6,8,10,12 - hexamethylpentadecane-13-olide dihydrochloride of the empirical formula $C_{37}H_{72}N_2O_{12}Cl_2$.

References Cited

UNITED STATES PATENTS 2,870,138   1/1959   Murray.
2,894,943   7/1959   Nelson et al.
3,125,569   3/1964   Martin et al.
3,198,833   8/1965   Beregi et al.
3,294,842   12/1966  Swanson.

LEWIS GOTTS, Primary Examiner

J. R. BROWN, Assistant Examiner

U.S. Cl. X.R.

260—999

PO-1050
(5/69)

UNITED STATES PATENT OFFICE
CERTIFICATE OF CORRECTION

Patent No. 3,478,014            Dated November 11, 1969

Inventor(s) Slobodan Djokic and Zrinka Tamburasov

It is certified that error appears in the above-identified patent and that said Letters Patent are hereby corrected as shown below:

Column 1, in the title, "ERYTROMYCIN" should read --ERYTHROMYCIN
            "CLANDINOSYL" should read --CLADINOSYL--
    line 30, the structural formula

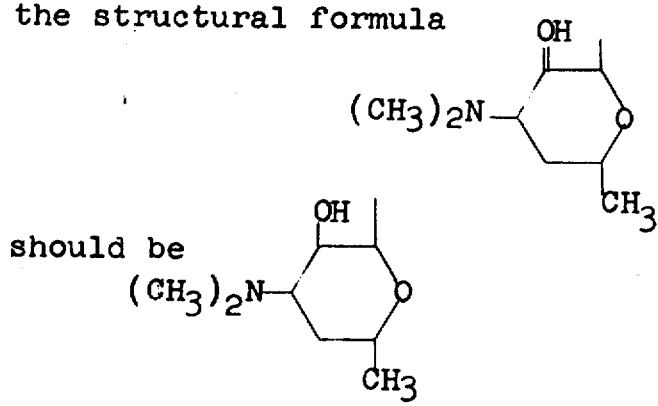

should be

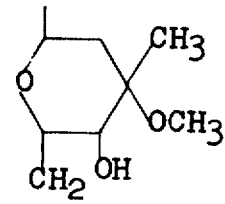

line 44, the structural formula

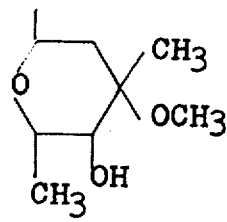

should be line 64, "A" should be --As--.
Column 2, line 49, "of" should be inserted before "460-500".

SIGNED AND
SEALED
JUN 2 1970

(SEAL)
Attest:

Edward M. Fletcher, Jr.
Attesting Officer

WILLIAM E. SCHUYLER, JR.
Commissioner of Patents

Notice of Adverse Decision In Interference

In Interference No. 97,925 involving Patent No. 3,478,014, S. Djokic and Z. Tamburasov, ERYTROMYCIN OXIME AND 9-AMINO-3-O-CLANDINOSYL - 5 - O - DESOSAMINYL - 6,11,12 - TRIHYDROXY-2,4,6,8,10,12-HEXAMETHYL-PENTADECANEOLIDE, final judgment adverse to the patentees was rendered Nov. 21, 1972, as to claim 2.

[*Official Gazette January 16, 1973.*]